United States Patent
Li et al.

(10) Patent No.: US 12,145,484 B2
(45) Date of Patent: Nov. 19, 2024

(54) CHILD SEAT, A VEHICLE DOOR STRUCTURE, A CHILD SEAT SYSTEM, AND A METHOD FOR OPERATING A CHILD SEAT SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Wenjie Li, Gothenburg (SE); Magnus Nilsson, Floda (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 199 days.

(21) Appl. No.: 17/873,026

(22) Filed: Jul. 25, 2022

(65) Prior Publication Data
US 2022/0371481 A1 Nov. 24, 2022

Related U.S. Application Data

(63) Continuation of application No. PCT/CN2020/142409, filed on Dec. 31, 2020.

(30) Foreign Application Priority Data

Feb. 3, 2020 (EP) ..................................... 20155143

(51) Int. Cl.
*B60J 5/04* (2006.01)
*B60N 2/28* (2006.01)

(52) U.S. Cl.
CPC ............ *B60N 2/283* (2013.01); *B60J 5/0413* (2013.01)

(58) Field of Classification Search
None
See application file for complete search history.

(56) References Cited

U.S. PATENT DOCUMENTS

| 2,822,858 A | 2/1958 | Erich Mussler | |
|---|---|---|---|
| 4,226,462 A | 10/1980 | Wellett | |
| 6,199,949 B1 | 3/2001 | Dasilva | |
| 6,547,303 B1 * | 4/2003 | Anderson | B60N 2/14 297/344.21 |
| 7,106,207 B1 | 9/2006 | Marchan | |
| 2005/0077765 A1 | 4/2005 | Biaud | |

(Continued)

FOREIGN PATENT DOCUMENTS

| CN | 1127197 A | 7/1996 |
|---|---|---|
| CN | 1342565 A | 4/2002 |

(Continued)

OTHER PUBLICATIONS

International Search Report from International Application No. PCT/CN2020/142409, mailed on Mar. 30, 2021, 2 pages.

(Continued)

*Primary Examiner* — Joseph D. Pape
(74) *Attorney, Agent, or Firm* — Tucker Ellis LLP

(57) ABSTRACT

A child seat for a vehicle. The child seat is configured for holding a child within an interior compartment of the vehicle, where the child seat includes an attachment arrangement adapted for attaching the child seat to a vehicle door structure.

20 Claims, 11 Drawing Sheets

(56) References Cited

U.S. PATENT DOCUMENTS

2008/0277956 A1* 11/2008 Karuppaswamy ...... B60R 5/041
296/37.1
2018/0251042 A1    9/2018 Baccouche
2018/0361889 A1   12/2018 Stamper

FOREIGN PATENT DOCUMENTS

| CN | 205440043 U    | 8/2016  |
|----|----------------|---------|
| DE | 9311789 U1     | 10/1993 |
| DE | 19843148 A1    | 3/2000  |
| DE | 102004013799 A1| 10/2005 |
| DE | 102004013800 A1| 10/2005 |

OTHER PUBLICATIONS

MobilityWorks, "A Vehicle Seat that Swivels and Lowers for Easy Safe Transfers," downloaded from Internet: URL: https://www.mobilityworks.com, Apr. 11, 2019, 6 pages.

* cited by examiner

US 12,145,484 B2

CHILD SEAT, A VEHICLE DOOR STRUCTURE, A CHILD SEAT SYSTEM, AND A METHOD FOR OPERATING A CHILD SEAT SYSTEM

RELATED APPLICATION DATA

This application is a continuation of International Patent Application No. PCT/CN2020/142409, filed Dec. 31, 2020, which claims the benefit of European Patent Application No. 20155143.9, filed Feb. 3, 2020, the disclosures of which are incorporated herein by reference in their entireties.

TECHNICAL FIELD

The present disclosure relates to a child seat for a vehicle, where the child seat is configured for holding a child within an interior compartment of the vehicle. The child seat comprises an attachment arrangement adapted for attaching the child seat to the vehicle. The disclosure further relates to a vehicle door structure, a child seat system, and a method for operating a child seat system.

BACKGROUND

Child seats and child seat systems are commonly used when transporting children in vehicles for increased safety. The child seat is providing protection for a child positioned in the child seat in a crash event. In many countries, the use of a child seat is a legal requirement when transporting smaller children. Child seats are often removably arranged in the vehicle, and for increased safety during transport modern child seats are often made with bulky constructions, which is limiting the space for a user when operating the child seat.

With the constructions of traditional child seats, putting a child in the child seat and securing the seat belt of the child seat around the child are sometimes burdensome and complicated tasks with non-ergonomic working positions for the user. Vehicle door openings are often narrow, and they are many times limiting the working space when placing the child in the child seat, especially in smaller vehicles. The door of the vehicle is further limiting the available working space for the user when opened. In addition, in cold weather when the child and the user are wearing thicker clothing, the task is even more complicated for the user. There is a risk that with the limited space available that the child is not properly seated in the child seat, which may lead to non-optimal safety for the child during transport.

There is thus a need for an improved child seat system where the child seat operation is simplified, and where the safety of the child seat system is high.

SUMMARY

An object of the present disclosure is to provide a child seat, a vehicle door structure, a child seat system, and a method for operating a child seat system where the previously mentioned problems are avoided. This object is at least partly achieved by the features of the independent claims. The dependent claims contain further developments of the child seat, the vehicle door structure, and the child seat system.

The disclosure concerns a child seat for a vehicle, where the child seat is configured for holding a child within an interior compartment of the vehicle. The child seat comprises an attachment arrangement adapted for attaching the child seat to a vehicle door structure.

Advantages with these features are that the tasks with putting a child in the child seat and securing the seat belt of the child seat around the child are less burdensome and complicated. Through the attachment of the child seat to the vehicle door structure, the child seat can move with the door when being opened. With such an arrangement, a user can easily operate the child seat when the door is in an open position without being limited by an open vehicle door or a narrow vehicle door opening. The arrangement is providing better ergonomic working positions for the user, and the working space is highly increased, even for smaller vehicles. When having free space above the child seat when the vehicle door is in the open position, the working position for the user is highly improved and the work with securely strapping the child to the child seat is facilitated. In addition, in cold weather when the child and the user are wearing thicker clothing, the task is less complicated for the user with the described solution. The risk with a non-properly seated child is reduced due to the simplified operations of the child seat and seat belts. Further, through the attachment arrangement, the child seat may be easily attached to and removed from the vehicle.

According to an aspect of the disclosure, the attachment arrangement comprises one or more attachment members. The one or more attachment members are adapted for engaging the vehicle door structure for holding the child seat in position in relation to the vehicle door structure.

According to another aspect of the disclosure, the one or more attachment members are arranged as one or more attachment hooks. The one or more attachment hooks are adapted for engaging one or more receiving openings of the vehicle door structure for holding the child seat in position in relation to the vehicle door structure. The receiving openings and the attachment hooks are providing a simple and efficient attachment system for attaching the child seat to the vehicle door structure.

According to an aspect of the disclosure, the attachment arrangement further comprises a locking lever. The locking lever is pivotably arranged between an unlocked position and a locked position. When the locking lever is arranged in the unlocked position, the child seat is attachable to and removable from the vehicle door structure. The locking lever comprises a locking surface, and the locking surface is adapted for engaging a vehicle door surface of the vehicle door structure when the locking lever is arranged in the locked position, preventing the child seat from being removed from the vehicle door structure. The locking lever is providing a simple and convenient locking function when the child seat is connected to the vehicle door structure.

According to another aspect of the disclosure, the attachment arrangement further comprises a first locking member. The first locking member is adapted for cooperating with a second locking member of the vehicle door structure for holding the child seat in locking engagement to the vehicle door structure, preventing the child seat from being removed from the vehicle door structure. The locking members are efficiently securing the child seat to the vehicle door structure for a safe child seat arrangement.

According to an aspect of the disclosure, the first locking member comprises a locking mechanism adapted for releasably connecting the first locking member to the second locking member. The child seat is adapted for being attachable to and removable from the vehicle door structure. The locking mechanism is thus being used when removing the child seat from the vehicle door structure and when attaching the child seat to the vehicle door structure.

According to another aspect of the disclosure, the locking mechanism comprises a housing structure and an elongated rod structure, wherein the rod structure is slidably arranged within the housing structure. The housing structure and the elongated rod structure are simple constructions that are easy to operate for the user.

According to a further aspect of the disclosure, the rod structure comprises one or more locking arms pivotably attached to a first end of the rod structure. The one or more locking arms are pivotable between a first position and a second position. In the first position, the one or more locking arms are aligned with, or essentially aligned with, an axial direction of the rod structure. In the first position, the rod structure and the housing structure are adapted to be insertable into and removable from the second locking member. In the second position, the one or more locking arms are arranged at a locking angle in relation to the axial direction for holding the child seat in locking engagement with an opening structure. The one or more locking arms are used for locking the child seat to the vehicle door structure in a simple and safe way. The locking arms can be pivoted between the different positions for a simple attachment and removal of the child seat to the vehicle door structure.

According to an aspect of the disclosure, a lever arm is connected to the housing structure and to a second end of the rod structure. The lever arm is adapted for slidingly moving the rod structure in relation to the housing structure between a first rod position and a second rod position. The one or more locking arms are adapted for being pivotable between the first position and the second position through the sliding movement of the rod structure in relation to the housing structure. In the first rod position the one or more locking arms are arranged in the first position, and in the second rod position the one or more locking arms are arranged in the second position. The lever arm is used as an actuator for the rod structure for a simple actuating function of the locking arms between the different locking arm positions.

According to another aspect of the disclosure, the one or more locking arms are interconnected by one or more springs. The one or more springs are adapted for holding the one or more locking arms in the second position. This arrangement is providing a simple and secure attachment of the child seat to the vehicle door structure.

According to a further aspect of the disclosure, the one or more locking arms are interconnected by one or more wires. The one or more wires are adapted for interacting with the rod structure for positioning the one or more locking arms in the first position when the rod structure is positioned in the first rod position.

According to an aspect of the disclosure, the child seat further comprises a child seat platform structure attached to and arranged underneath the child seat. The attachment arrangement is arranged on the child seat platform structure. The child seat platform structure may be securely attached to the bottom part of the child seat, and the attachment arrangement is attached to or is a part of the child seat platform structure. The child seat platform structure is providing a rigid and safe holding construction for the child seat when attached to the vehicle door structure.

The disclosure further concerns a vehicle door structure, where the vehicle door structure is adapted for cooperating with a child seat comprising an attachment arrangement for attaching the child seat to the vehicle door structure. The vehicle door structure is constructed for securely holding the child seat. The attachment of the child seat to the vehicle door structure is simplifying the operation of the child seat when the child seat can move with the vehicle door when opened and closed.

According to an aspect of the disclosure, the vehicle door structure comprises one or more receiving openings adapted for receiving one or more attachment hooks of the attachment arrangement, for holding the child seat in position in relation to the vehicle door structure. The vehicle door structure comprises a second locking member, and the second locking member is adapted for cooperating with a first locking member of the attachment arrangement for holding the child seat in locking engagement to the vehicle door structure, preventing the child seat from being removed from the vehicle door structure. The receiving openings and the attachment hooks are providing a simple and efficient attachment system for attaching the child seat to the vehicle door structure. The locking members are efficiently securing the child seat to the vehicle door structure for a safe child seat arrangement.

The disclosure further concerns a child seat system for a vehicle comprising a child seat as described above. The child seat is configured for holding a child within an interior compartment of the vehicle. The child seat system further comprises a vehicle door structure, and the child seat is adapted for being attachable to the vehicle door structure. With the system, the tasks with putting the child in the child seat and securing the seat belt of the child seat around the child are less burdensome and complicated. Through the attachment of the child seat to the vehicle door structure, the child seat can move with the door when being opened. The user can easily operate the child seat with better ergonomic working positions when the door is in an open position without being limited by a vehicle door or a narrow vehicle door opening. The risk with a non-properly seated child is reduced due to the simplified operations of the child seat and seat belts. Further, through the attachment arrangement, the child seat may be easily attached to and removed from the vehicle.

According to an aspect of the disclosure, the child seat of the system comprises an attachment arrangement for attaching the child seat to the vehicle door structure. The attachment arrangement comprises one or more attachment hooks, and the vehicle door structure comprises one or more receiving openings adapted for receiving the one or more attachment hooks for holding the child seat in position in relation to the vehicle door structure. The receiving openings and the attachment hooks are providing a simple and efficient attachment system for attaching the child seat to the vehicle door structure.

According to another aspect of the disclosure, the attachment arrangement of the system comprises a first locking member and the vehicle door structure comprises a second locking member. The first locking member is adapted for cooperating with the second locking member for holding the child seat in locking engagement to the vehicle door structure preventing the child seat from being removed from the vehicle door structure. The locking members are efficiently securing the child seat to the vehicle door structure for a safe child seat arrangement.

The disclosure further concerns a method for operating a child seat system for a vehicle, where the child seat system comprises a child seat configured for holding a child within an interior compartment of the vehicle. The child seat system further comprises a vehicle door structure. The method comprises the step: attaching the child seat to the vehicle door structure. With the method, the child seat may be easily attached to and removed from the vehicle. The tasks with putting the child in the child seat and securing the seat belt of the child seat around the child are less burdensome and complicated. With the attachment of the child seat to the vehicle door structure, the child seat can move with the door when being opened, which is providing an easy operation of the child seat with better ergonomic working positions. When the door is in an open position, the user is not being limited by a vehicle door or a narrow vehicle door opening. The risk with a non-properly seated child is reduced due to the simplified operations of the child seat and seat belts.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
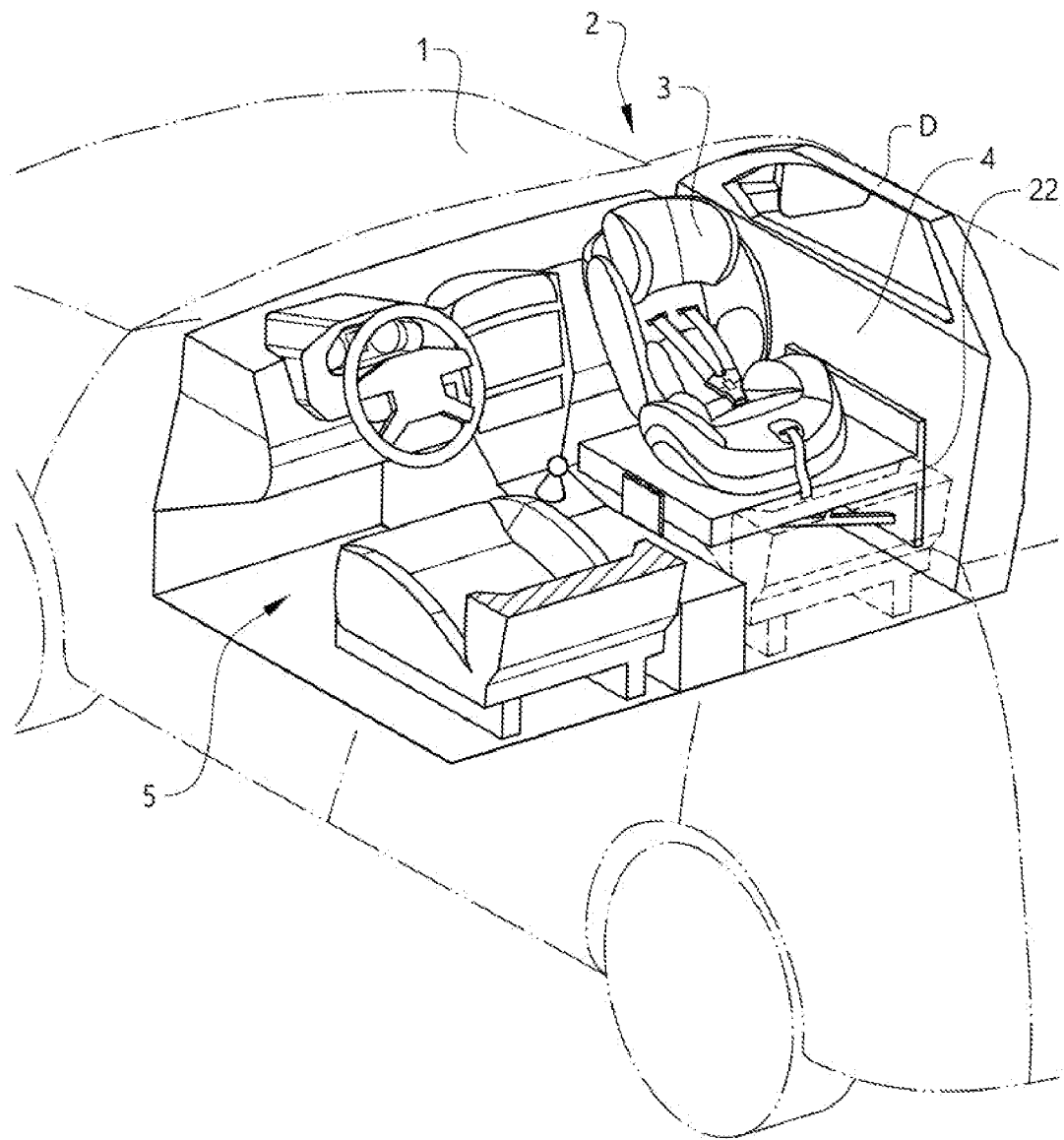
FIG. 1 shows schematically, in a perspective view, a child seat system for a vehicle according to the disclosure.
Figure 2A:
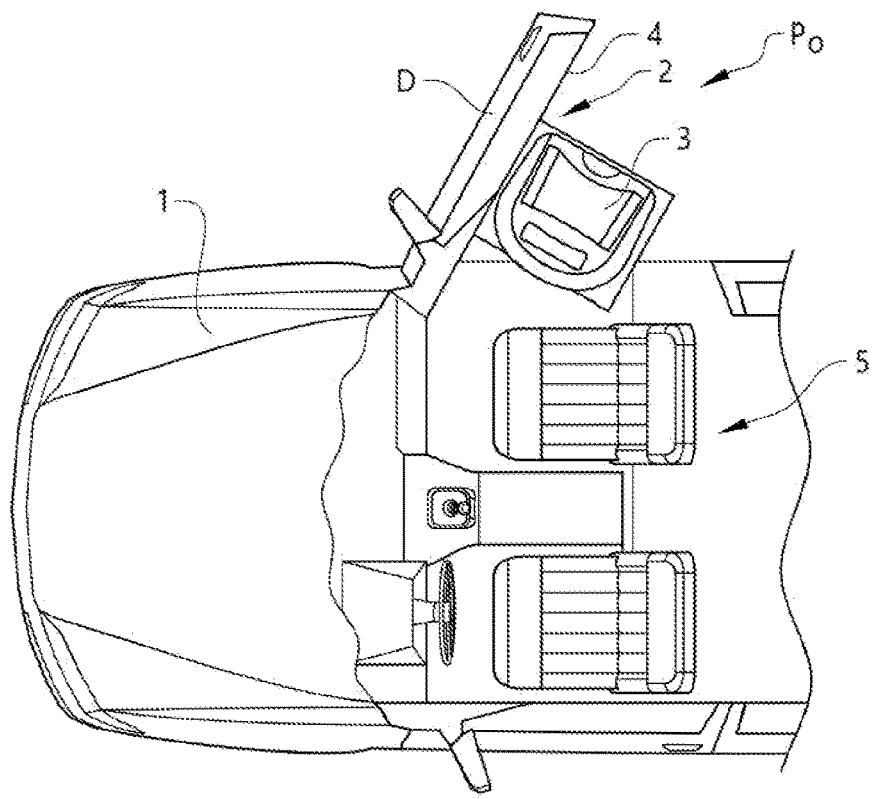
FIG. 2A-2B show schematically, in views from above, the child seat system with a vehicle door structure in an open position and a closed position according to the disclosure.
Figure 2B:
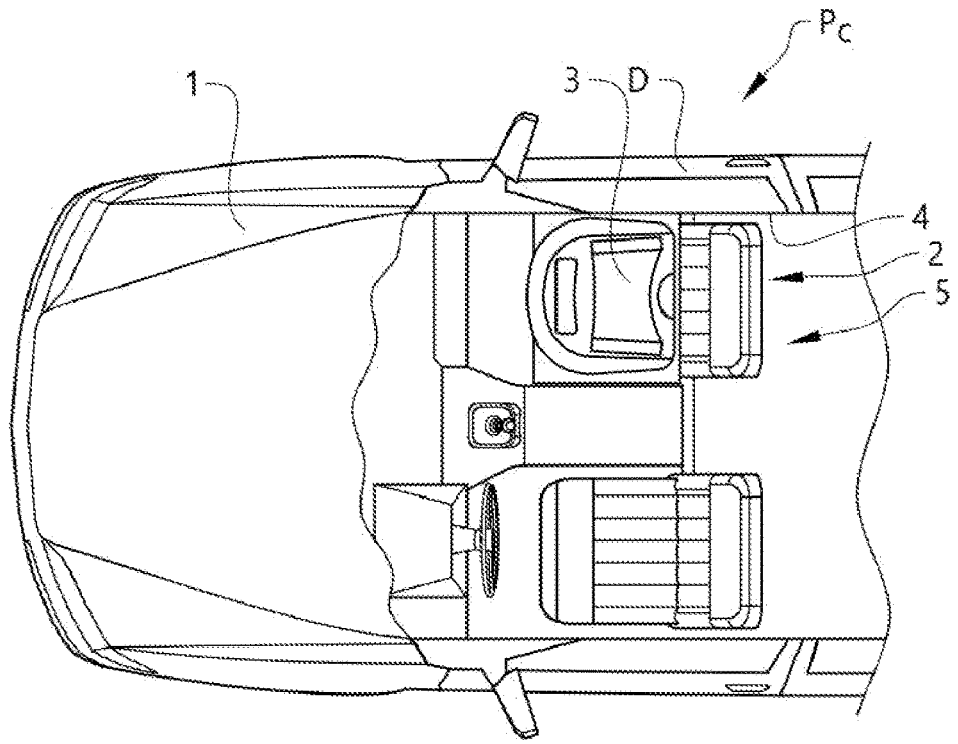

FIGS. 1 and 2A-2B schematically show a child seat system 2 for a vehicle 1, where the child seat system 2 comprises a child seat 3. The child seat 3 may have a traditional configuration and design with a seat structure 3a, a backrest structure 3b, and a headrest structure 3c, as schematically illustrated in for example FIGS. 3A-3B. It should be understood that the backrest structure 3b and the headrest structure 3c may be integrated into a common structure or alternatively arranged as separate structures. The headrest structure 3c may for example be arranged as an adjustable part of the child seat 3 connected to the backrest structure 3b. The respective structures may further be provided with padding and an outer cover structure 3d, where the outer cover structure 3d may be made of suitable fabrics or other suitable materials. The outer cover structure 3d may be removably arranged on the child seat 3. The respective child seat structures may each have its own outer cover structure 3d, or the outer cover structure 3d may be arranged to cover two or more of the child seat structures.

The child seat 3 is configured for holding a child C within an interior compartment 5 of the vehicle 1. The child seat 3 may be equipped with a seat belt arrangement 3e to hold the child C safely in the child seat 3 during driving.

Figure 3A:
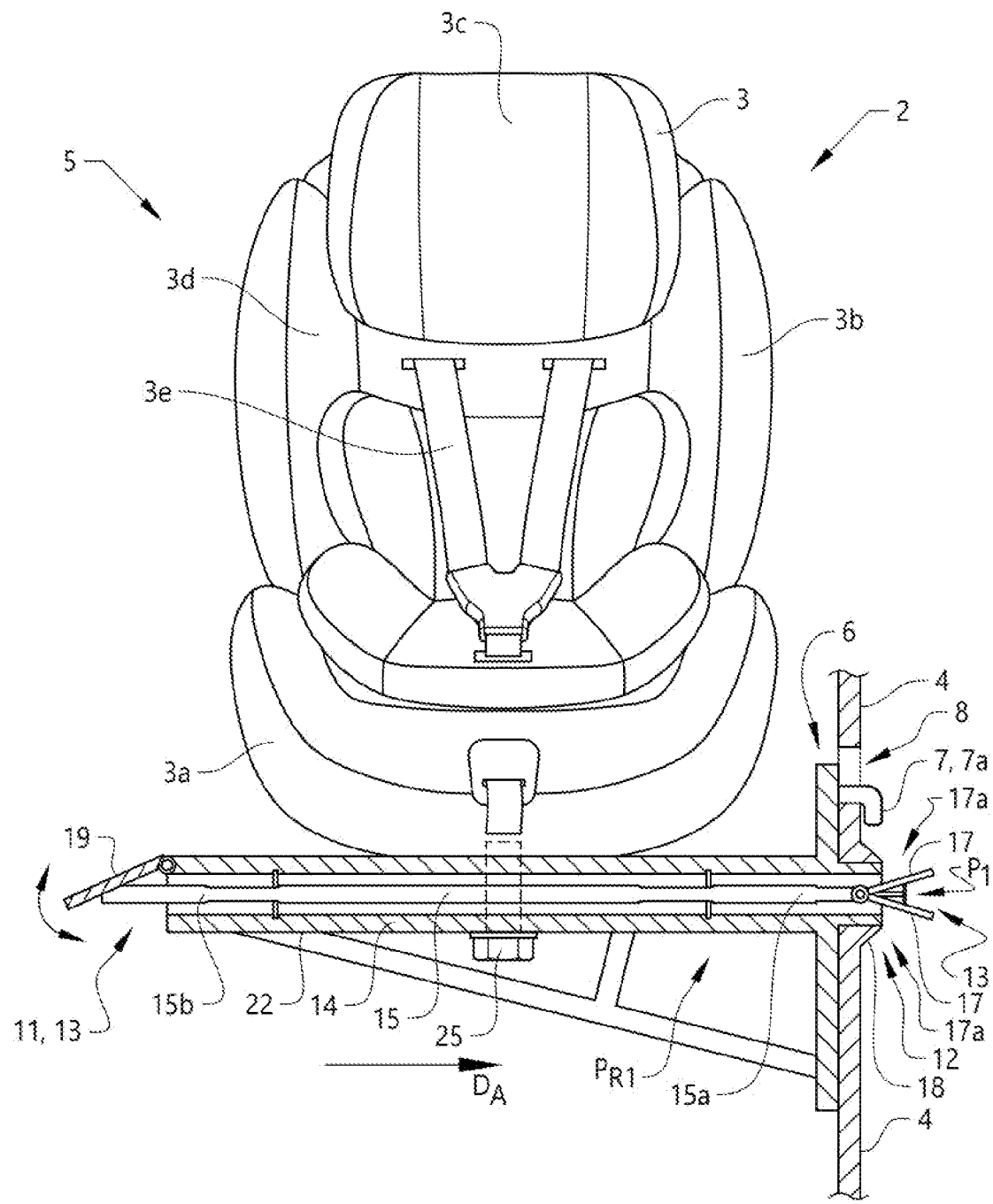
FIG. 3A-3D show schematically, in front views and in cross-sectional views, the child seat system with an attachment arrangement in a first position and a second position according to the disclosure.
Figure 3B:
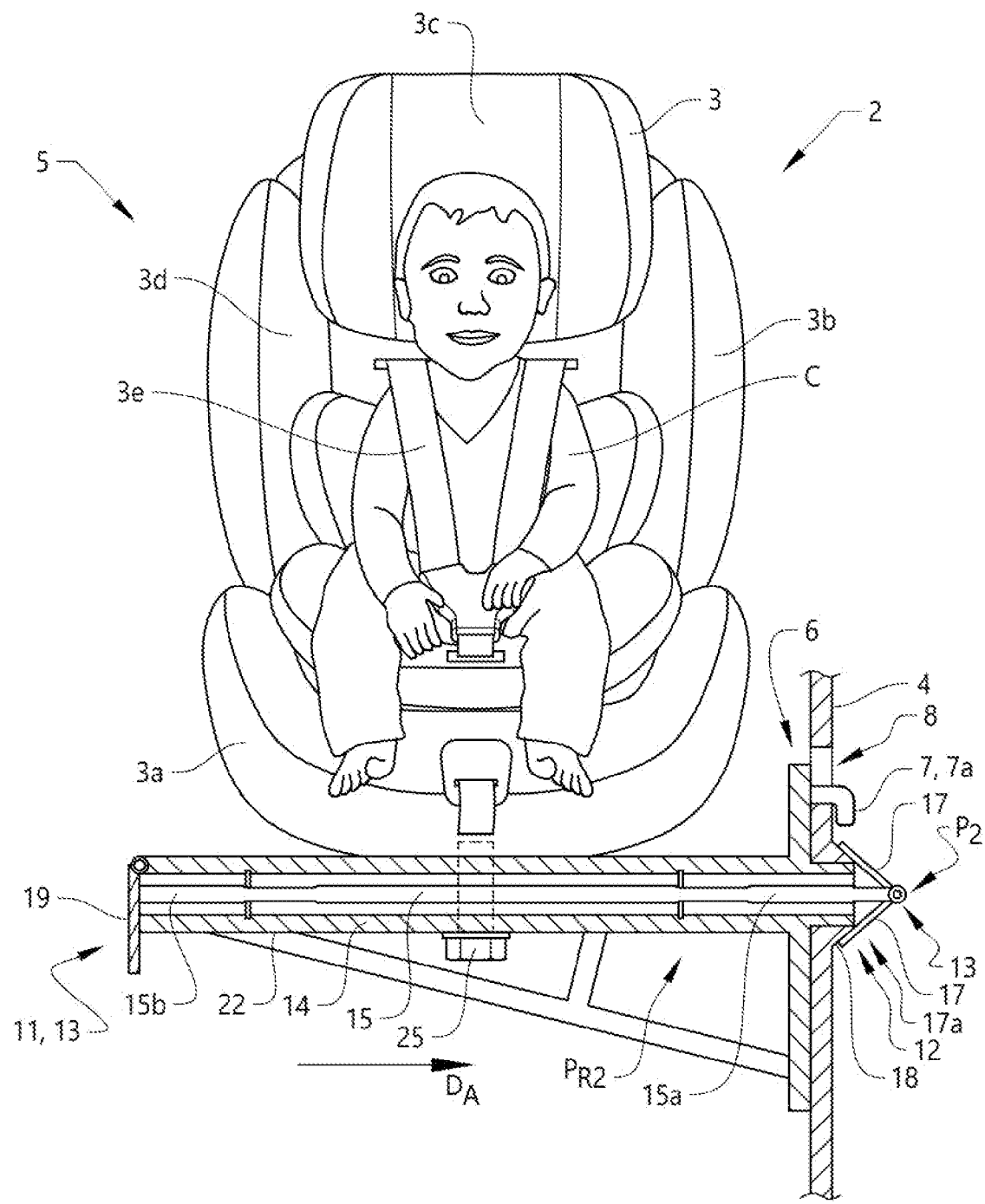

According to the disclosure, the child seat 3 comprises an attachment arrangement 6 adapted for attaching the child seat 3 to a vehicle door structure 4, as shown in FIGS. 3A-3D, 4A-4C and 5A-5B. By arranging the child seat 3 on the vehicle door structure 4, the child seat 3 is arranged to move with the vehicle door D during opening and closing operations, as schematically illustrated in FIGS. 2A-2B. The vehicle door structure 4 may relate to the entire structure of a vehicle door D, and the child seat 3 is attached to a side of the vehicle door D facing the interior compartment 5 when the vehicle door D is closed. The vehicle door structure 4 may also relate to a part of the vehicle door D, such as for example an interior trim panel or similar structure to which the child seat 3 is attached, facing the interior compartment 5 when the vehicle door D is closed. In FIG. 2B, the child seat 3 is attached to the vehicle door structure 4 with the vehicle door D in a closed position $P_C$, and the child seat 3 is arranged within the interior compartment 5 without the child C being positioned in the child seat 3. When the child seat 3 is attached to the vehicle door D, the child C can be placed in the child seat 3 when the vehicle door D is in an open position $P_O$, as schematically illustrated in FIG. 2A. Once the child C has been correctly placed in the child seat 3, as shown in FIG. 3B, the vehicle door D can be closed for a safe transportation with the child C positioned in the child seat 3 and arranged within the interior compartment 5 of the vehicle.

As shown in the figures, the child seat 3 further comprises a child seat platform structure 22 attached to and arranged underneath the child seat 3. The attachment arrangement 6 is arranged on the child seat platform structure 22. The child seat platform structure 22 may be arranged with a side plate to which parts of the attachment arrangement 6 is connected. The child seat 3 may be attached to the child seat platform structure 22 with any suitable attachment means, such as for example screws or rivets. In the illustrated embodiments shown in FIGS. 3A-3B and 6A, a screw 25 is arranged for attaching the child seat 3 to the platform structure 22. The child seat 3 may also be removably attached to the child seat platform structure 22 if desired. The child seat platform structure 22 may be made in a strong lightweight construction of any suitable material, such as for example aluminium, plastic materials, composite materials, or a combination of different materials.

With the described child seat 3 and the attachment of the child seat 3 to the vehicle door structure 4, the tasks for a user with putting the child C in the child seat 3 and securing the seat belt arrangement 3e of the child seat 3 around the child C is highly simplified compared to a traditional child seat positioned on the seats of the vehicle. The user can easily operate the child seat 3 when the vehicle door D is in an open position without being limited by the vehicle door D or a narrow vehicle door opening. The attachment of the child seat 3 to the vehicle door structure 4 is providing better ergonomic working positions for the user. The risk with the child C being non-properly seated is highly reduced compared to traditional child seat solutions due to the simplified operations of the child seat and seat belts for the user.

Further, through the attachment arrangement 6, the child seat 3 may be easily attached to and removed from the vehicle.

The attachment arrangement 6 of the child seat 3 comprises one or more attachment members 7, as for example schematically illustrated in FIGS. 3A-3D and 4A-4C. The one or more attachment members 7 are adapted for engaging the vehicle door structure 4 for holding the child seat 3 in position in relation to the vehicle door structure 4. The one or more attachment members 7 are arranged as one or more attachment hooks 7a attached to the side plate of the child seat platform structure 22. The vehicle door structure 4 comprises one or more receiving openings 8 adapted for receiving the one or more attachment hooks 7a of the attachment arrangement 6 for holding the child seat 3 in position in relation to the vehicle door structure 4, as shown in FIGS. 3A-3C and 5A-5B. The one or more attachment hooks 7a are arranged to engage the one or more receiving openings 8 of the vehicle door structure 4, as schematically illustrated in FIGS. 3A-3D. In the embodiment shown in FIGS. 3A-3D, 4A-4C, and 5A-5B, the attachment arrangement 6 comprises two attachment hooks 7a, and the attachment hooks 7a are arranged to cooperate with two corresponding receiving openings 8 in the vehicle door structure 4.

Figure 3C:
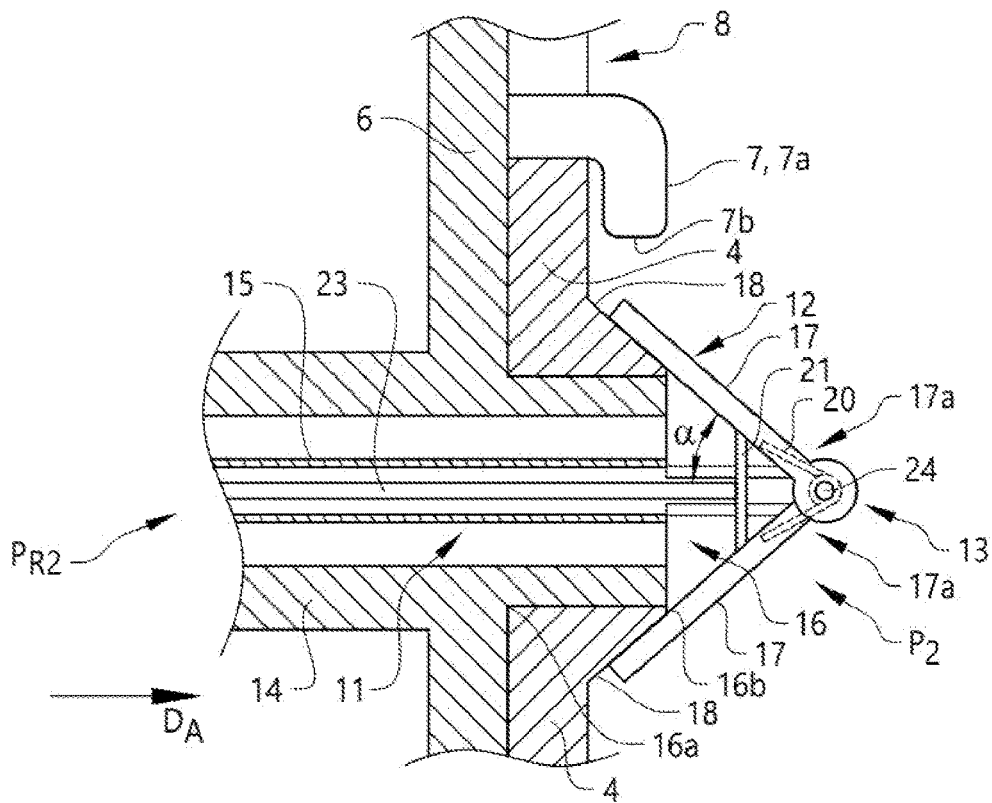

As illustrated in for example FIG. 3C, the attachment hooks 7a are bent in a shape where hook tips 7b of the attachment hooks 7a are pointing in a direction downwards when cooperating with the corresponding receiving openings 8 of the vehicle door structure 4. To attach the child seat 3 to the vehicle door structure 4, the attachment hooks 7a are aligned with the corresponding receiving openings 8 and pushed into the respective receiving openings 8. Once the attachment hooks 7a have entered the corresponding receiving openings 8, the child seat 3 and the child seat platform structure 22 with the attachment hooks 7a are pushed in a direction downwards to secure the child seat 3 to the vehicle door structure 4. In this way, the child seat platform structure 22 is being hooked onto the door structure 4. In FIGS. 3A-3B, the attachment of the child seat 3 to the vehicle door structure 4 is schematically illustrated.

In the embodiment illustrated in FIGS. 3A-3D, 4A-4C, and 5A-5B, the attachment arrangement 6 of the child seat 3 further comprises a first locking member 11. The vehicle door structure 4 comprises a second locking member 12, and the first locking member 11 and the second locking member 12 are adapted for cooperating with each other for holding the child seat 3 in locking engagement to the vehicle door structure 4. The first locking member 11 and the second locking member 12 are preventing that the child seat 3 is removed from the vehicle door structure 4 during usage. The first locking member 11 comprises a locking mechanism 13. The locking mechanism 13 is adapted for releasably connecting the first locking member 11 to the second locking member 12. Through the engagement between the first locking member 11 and the second locking member 12, the child seat 3 is attachable to and removable from the vehicle door structure 4, and when desired locked in position in relation to the vehicle door structure 4 with the locking mechanism 13.

Figure 3D:
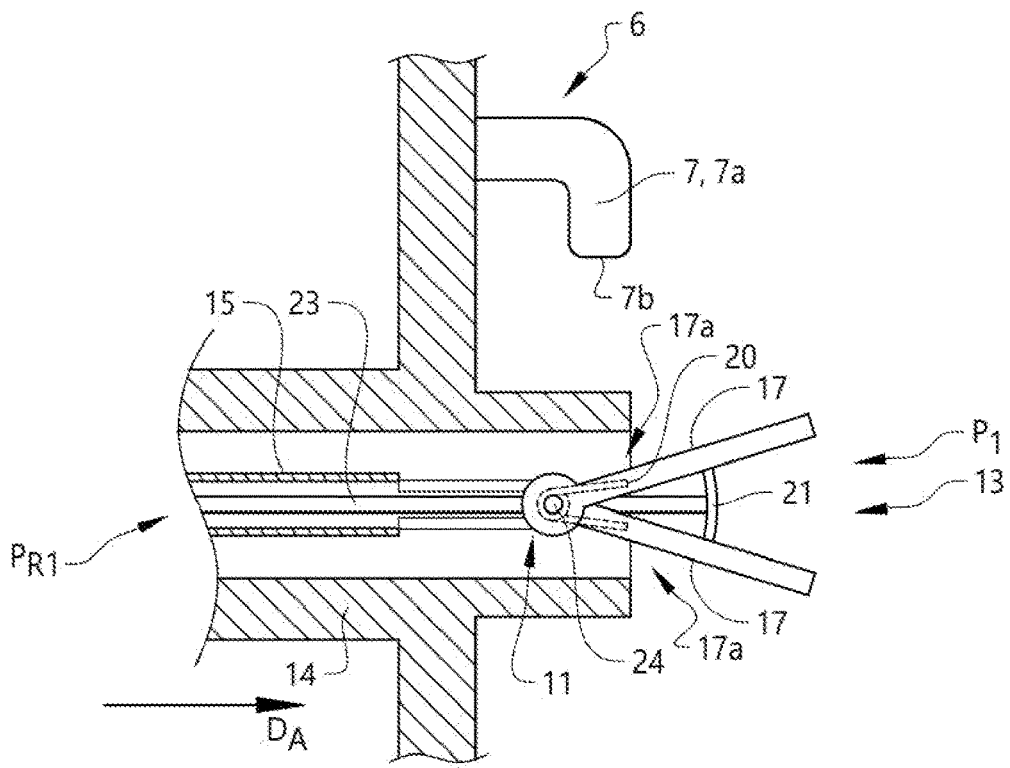

As shown in FIGS. 3A-3D and 4A-4C, the locking mechanism 13 comprises a housing structure 14 and an elongated rod structure 15. The rod structure 15 is slidably arranged within the housing structure 14. The housing structure 14 may be arranged as a channel-like or tube-like construction in which the rod structure 15 is movably arranged between different positions. The housing structure 14 and/or the rod structure 15 may be provided with suitable holding means for positioning the housing structure 14 and the rod structure 15 in relation to each other. The rod structure 15 comprises one or more locking arms 17 pivotably attached to a first end 15a of the rod structure 15. An inner end 17a of each locking arm 17 is pivotally attached to the rod structure 15 through a pivoting mechanism 24, as shown in FIGS. 3C-3D. The pivoting mechanism 24 may for example be arranged as a hinge mechanism or other suitable pivoting attachment means. In the embodiment illustrated in FIGS. 3A-3D and 4A-4C, the rod structure 15 comprises two locking arms 17, but any suitable number of locking arms may be used.

Figure 4A:
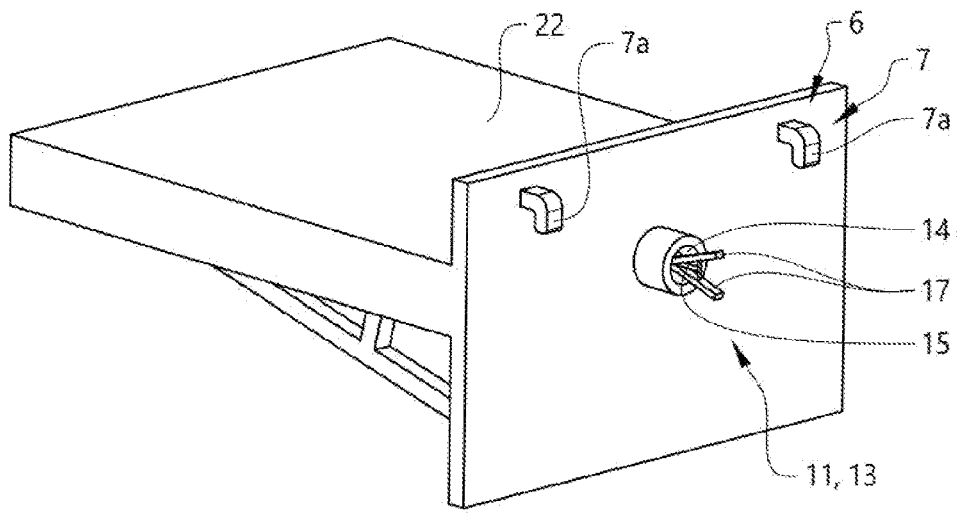
FIG. 4A-4C show schematically, in a perspective view and in cross-sectional views, a child seat platform structure with the attachment arrangement in the first position and the second position according to the disclosure.
Figure 4B:
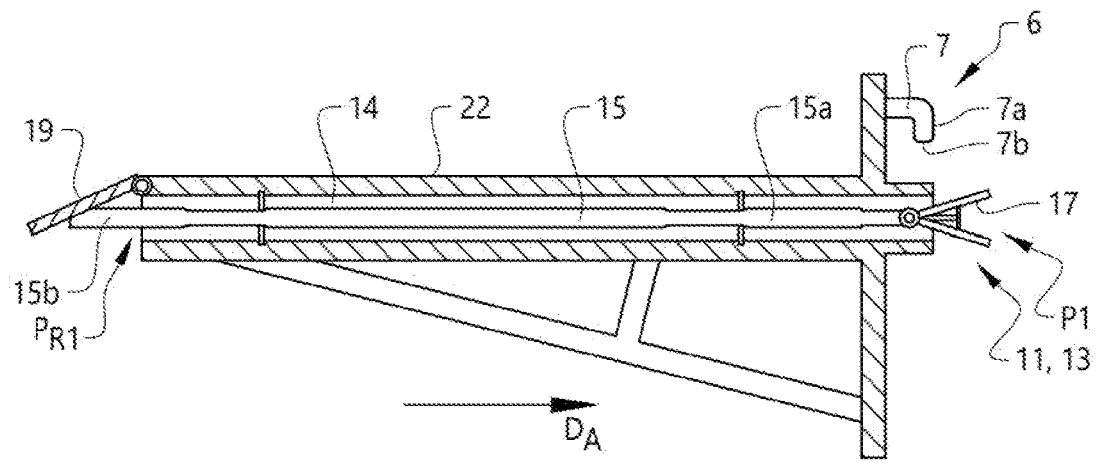
Figure 4C:
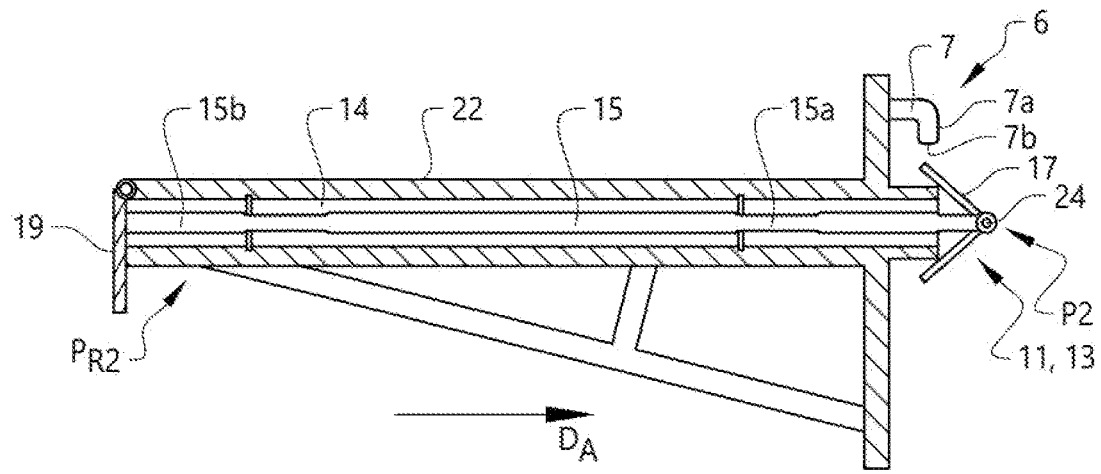

The one or more locking arms 17 are pivotable between a first position $P_1$, as illustrated in FIGS. 3A, 3D, and 4B, and a second position $P_2$, as illustrated in FIGS. 3B, 3C, and 4C. In the first position $P_1$ the one or more locking arms 17 are aligned with, or essentially aligned with, an axial direction $D_A$ of the rod structure 15. In the first position $P_1$, the rod structure 15 and the housing structure 14 are insertable into and removable from the second locking member 12, and in the second position $P_2$ the one or more locking arms 17 are arranged at a locking angle $\alpha$ in relation to the axial direction $D_A$ for holding the child seat 3 in locking engagement with the vehicle door structure 4, as illustrated in FIG. 3C.

Figure 5A:
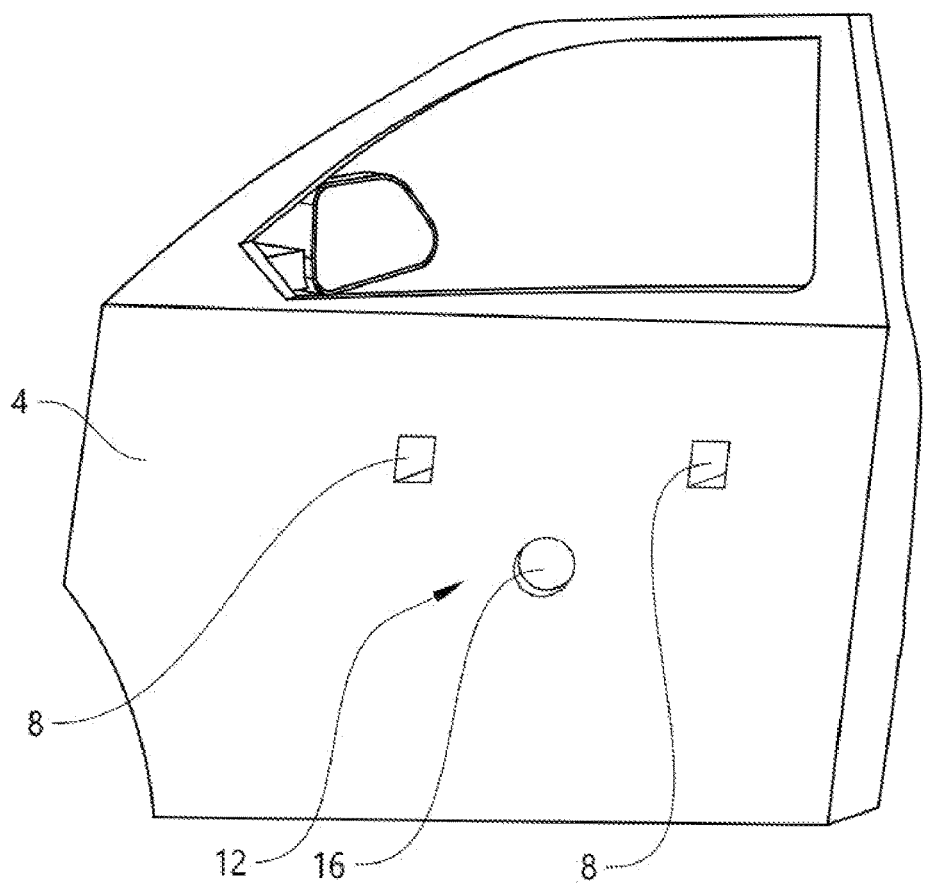
FIG. 5A-5B show schematically, in a perspective view and in a cross-sectional view, the vehicle door structure according to the disclosure.
Figure 5B:
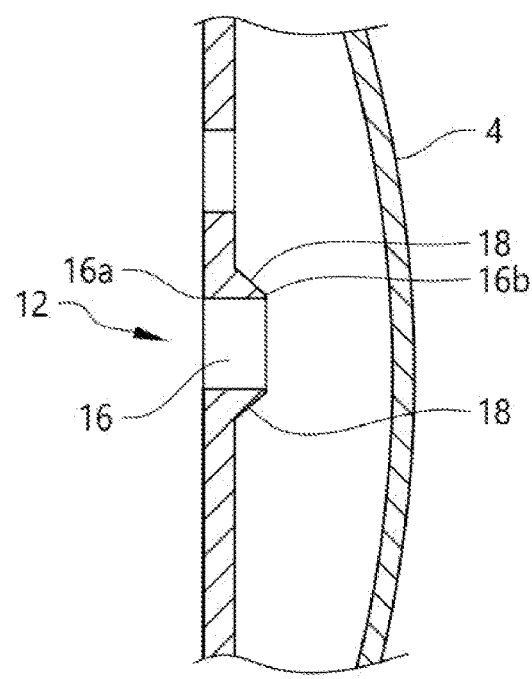

As illustrated in FIGS. 3C and 5A-5B, the second locking member 12 of the vehicle door structure 4 is arranged as an opening structure 16 in the vehicle door structure 4. The opening structure 16 is adapted for receiving the housing structure 14 of the locking mechanism 13 of the first locking member 11. The opening structure 16 may be provided with reinforcing structures or similar arrangements for a robust connection between the child seat 3 and the vehicle door structure 4. The opening structure 16 comprises an inner opening section 16a facing the interior compartment 5 of the vehicle 1, and an outer opening section 16b, as shown in FIGS. 3C and 5B. The outer opening section 16b is facing the exterior side of the vehicle door structure 4 and may be arranged inside the vehicle door structure 4, for example between an interior trim panel and an outer door structure.

The vehicle door structure 4 further comprises one or more locking engagement surfaces 18 arranged in connection to the outer opening section 16a, as for example shown in FIGS. 3A-3C and 5B. The one or more locking engagement surfaces 18 are adapted for engaging each of the one or more locking arms 17 of the locking mechanism 13 for a secure attachment between the child seat 3 and the vehicle door structure 4. In the embodiment illustrated in FIGS. 3A-3D and 5A-5B, the opening structure 16 comprises two oppositely arranged locking engagement surfaces 18 arranged to cooperate with the corresponding two locking arms 17. As further illustrated, the locking engagement surfaces may be inclined to correspond to the locking angle $\alpha$ of the locking arms 17, as for example shown in FIG. 2c. Thus, in the second position $P_2$ the one or more locking arms 17 of the rod structure 15 are arranged at the locking angle $\alpha$ in relation to the axial direction $D_A$ for holding the child seat 3 in locking engagement with the locking engagement surfaces 18 of the opening structure 16, as illustrated in FIG. 3C.

As shown in FIGS. 3A-3B and 4B-4C, a lever arm 19 is pivotably connected to both the housing structure 14 and to a second end 15b of the rod structure 15 with suitable connection means, such as for example hinges or pivoting shafts. The lever arm 19 is adapted for slidingly moving the rod structure 15 in relation to the housing structure 14 between a first rod position $P_{R1}$, as illustrated in FIGS. 3A and 4B, and a second rod position $P_{R2}$, as illustrated in FIGS. 3B and 4C. When operating the lever arm 19, the rod structure 15 is displaced in the axial direction $D_A$ between the first rod position $P_{R1}$ and the second rod position $P_{R2}$. As shown in FIGS. 3A-3B, the rod structure 15 is moving in the axial direction $D_A$ in a direction towards the door structure 4 when the lever arm 19 is displacing the rod structure 15 from the first rod position $P_{R1}$ to the second rod position $P_{R2}$. With reference to FIGS. 3A-3B, the rod structure 15 is moving to the right in the figure when the rod structure 15 is displaced from the first rod position $P_{R1}$ to the second rod position $P_{R2}$. The rod structure 15 is moving in the opposite direction away from the door structure 4 when the lever arm 19 is displacing the rod structure 15 from the second rod position $P_{R2}$ to the first rod position $P_{R1}$. With reference to FIGS. 3A-3B, the rod structure 15 is moving to the left in the figure when the rod structure 15 is displaced from the second rod position $P_{R2}$ to the first rod position $P_{R1}$.

As further schematically illustrated in FIGS. 3A-3D, the one or more locking arms 17 are adapted for being pivotable between the first position $P_1$ and the second position $P_2$ through the sliding movement of the rod structure 15 in relation to the housing structure 14. The construction of the rod structure 15 and the locking arms 17 are configured to move the locking arms 17 between the respective first and second positions when the rod structure 15 is displaced between the first and second rod positions with the lever arm 19. In the first rod position $P_{R1}$ the one or more locking arms 17 are arranged in the first position $P_1$, and in the second rod position $P_{R2}$ the one or more locking arms 17 are arranged in the second position $P_2$. The movement of the locking arms 17 in relation to the rod structure 15 around the pivoting mechanism 24 may be established with any suitable displacement means.

The pivoting mechanism 24 may for example comprise gears or similar structures connected to the rod structure 15 and the locking arms 17, for moving the locking arms 17. The movement of the locking arms 17 may alternatively be established with one or more electric actuators if desired instead of using the lever arm 19. The one or more electric actuators are configured to displace the locking arms 17, and may be connected to a power source arranged in the child seat 3 or in the vehicle 1. The electric actuator may for example be a suitable electric motor connected to a switch mechanism.

The one or more locking arms 17 may be interconnected by one or more springs 20, as shown in FIGS. 3C-3D, where the one or more springs 20 are arranged for holding the one or more locking arms in the second position $P_2$. The one or more locking arms 17 may further be interconnected by one or more wires 21, where the one or more wires 21 are arranged for interacting with an actuating mechanism 23 for positioning the one or more locking arms 17 in the first position $P_1$ when the rod structure 15 is positioned in the first rod position $P_{R1}$, and for positioning the one or more locking arms 17 in the second position $P_2$ when the rod structure 15 is positioned in the second rod position $P_{R2}$. In the embodiment illustrated in FIGS. 3C-3D, a single torsion spring 20 is connected to and arranged between the two locking arms 17, and a single wire 21 is connected to and arranged between the two locking arms 17. The torsion spring 20 is configured in an initial or unloaded state when the locking arms 17 are positioned in the second position $P_2$, and configured in a loaded state in the first position $P_1$. In the first position $P_1$, the locking arms 17 are thus striving towards the stable second position $P_2$ through action from the spring 20. Depending on the attachment of the wire 21 to the locking arms 17, the wire 21 may be made of a suitable elastic or non-elastic material. It should be understood that any suitable type of spring could be used.

The actuating mechanism 23 may be arranged as a movable rod structure connected to a mid-section of the wire 21. When displacing the rod structure 15 in the axial direction $D_A$ in a direction towards the interior compartment 5a, from the second rod position $P_{R2}$ where the locking arms 17 are arranged in the second position $P_2$ as illustrated in FIG. 3C, the actuating mechanism 23 and the wire 21 are displacing the locking arms 17 towards the first position $P_1$. By further displacing the wire 21 in the same direction, the locking arms 17 are moved to the first position $P_1$, as shown in FIG. 3D. When displacing the locking arms 17 from the second position $P_2$ to the first position $P_1$, the force from the actuating mechanism 23 via the wire 21 is loading the spring 20. To move the locking arms 17 from the first position $P_1$ to the second position $P_2$, the rod structure 15 is moved in the opposite direction and the actuating mechanism 23 is released, wherein the force from the spring 20 is displacing the locking arms 17. The actuating mechanism 23 may be configured as a non-moving rod structure attached to the housing structure 14 for impacting the locking arms 17 via the wire 21 upon movement of the rod structure 15.

In an alternative embodiment, the actuating mechanism 23 may be configured as a moving mechanism, and any suitable actuating means may be used for displacing the actuating mechanism 23 in relation to the rod structure 15, such as for example a gear and pinion construction, a wire construction, or an electrical actuator. The actuating mechanism 23 may be arranged to move in the axial direction $D_A$ in relation to the rod structure 15 upon activation of the rod structure between the first rod position $P_{R1}$ and the second rod position $P_{R2}$. The actuating mechanism 23 may be slidably arranged in relation to the rod structure 15, and positioned in a parallel, or essentially parallel, external or internal relationship. If arranging the actuating mechanism 23 inside the rod structure 15, the rod structure 15 may be arranged as a tubular construction with a channel for the actuating mechanism 23. The actuating mechanism 23 may suitably be actuated with the lever arm 19 when displacing the rod structure 15 between the first rod position $P_{R1}$ and the second rod position $P_{R2}$.

To operate the child seat system 2 of the embodiment schematically illustrated in FIGS. 3A-3D, 4A-4C, and 5A-5B, and to attach the child seat 3 to the vehicle door structure 4, the lever arm 19 with the rod structure 15 are arranged in the first rod position $P_{R1}$ in order to prepare the child seat 3 for being attached to the vehicle door structure 4. In the first rod position $P_{R1}$, the locking arms 17 are as described above arranged in the first position $P_1$ shown in FIG. 3A. In the first rod position $P_{R1}$, the locking arms 17 are at least partly arranged inside the housing structure 14 for a convenient attachment of the child seat 4 to the vehicle door structure 4. To attach the child seat 3 to the vehicle door structure 4, the attachment hooks 7a are aligned with the corresponding receiving openings 8 of the vehicle door structure 4, and the attachment hooks 7a are pushed into the respective receiving openings 8. Once the attachment hooks 7a have entered the corresponding receiving openings 8, the child seat 3 with the attachment hooks 7a are pushed in a direction downwards to secure the child seat 3 to the vehicle door structure 4. At the same time, the housing structure 14 is aligned with the opening structure 16 and pushed into the opening structure 16 into the position shown in FIG. 3A, together with the rod structure 15 and the locking arms 17. When the attachment hooks 7a are connected to the corresponding receiving openings 8 and the housing structure 14 is in a correct position in relation to the opening structure 16, the child seat 3 is prepared for being locked to the vehicle door structure 4. In the described position, the lever arm 19 is moved from the position illustrated in FIG. 3A to the position illustrated in FIG. 3B. With the movement of the lever arm 19, the rod structure 15 with the locking arms 17 are displaced in relation to the housing structure 14 from the first rod position $P_{R1}$ to the second rod position $P_{R2}$ into the vehicle door structure 4, and at the same time the locking arms 17 are moved from the first position $P_1$ to the second position $P_2$. During the movement of the rod structure 15 from the first rod position $P_{R1}$ to the second rod position $P_{R2}$, the locking arms 17 are moved from the first position $P_1$ to the second position $P_2$ through the engagement with the actuating mechanism 23. In the second rod position $P_{R2}$, the locking arms 17 are arranged in the second position $P_2$, and the locking arms 17 are locking the child seat 3 to the vehicle door structure 4, preventing the child seat 3 from being removed from the vehicle door structure 4. The locking arms 17 are engaging the locking engagement surfaces 18 for a secure attachment of the child seat 3 to the vehicle door structure 4. The locking arms 17 and/or the locking engagement surfaces 18 may be arranged with suitable materials for increased holding capacity and long-lasting capabilities, such as for example polymers, or rubber materials with high friction. The lever arm 19 may further be arranged with a suitable locking arrangement for preventing unwanted or accidental movement of the lever arm 19 and the rod structure 15 from the second rod position $P_{R2}$ to the first rod position $P_{R1}$.

To remove the child seat 3 from the vehicle door structure, the locking mechanism 13 is operated in the reverse order. The lever arm 19 and the rod structure 15 with the locking arms 17 are moved from the second rod position $P_{R2}$ illustrated in FIG. 3B to the first rod position $P_{R1}$ illustrated in FIG. 3A. Upon displacement of the rod structure 15, the locking arms 17 are displaced from the second position $P_2$ to the first position $P_1$, and the child seat 3 can be removed from the vehicle door structure 4.

Figure 6A:
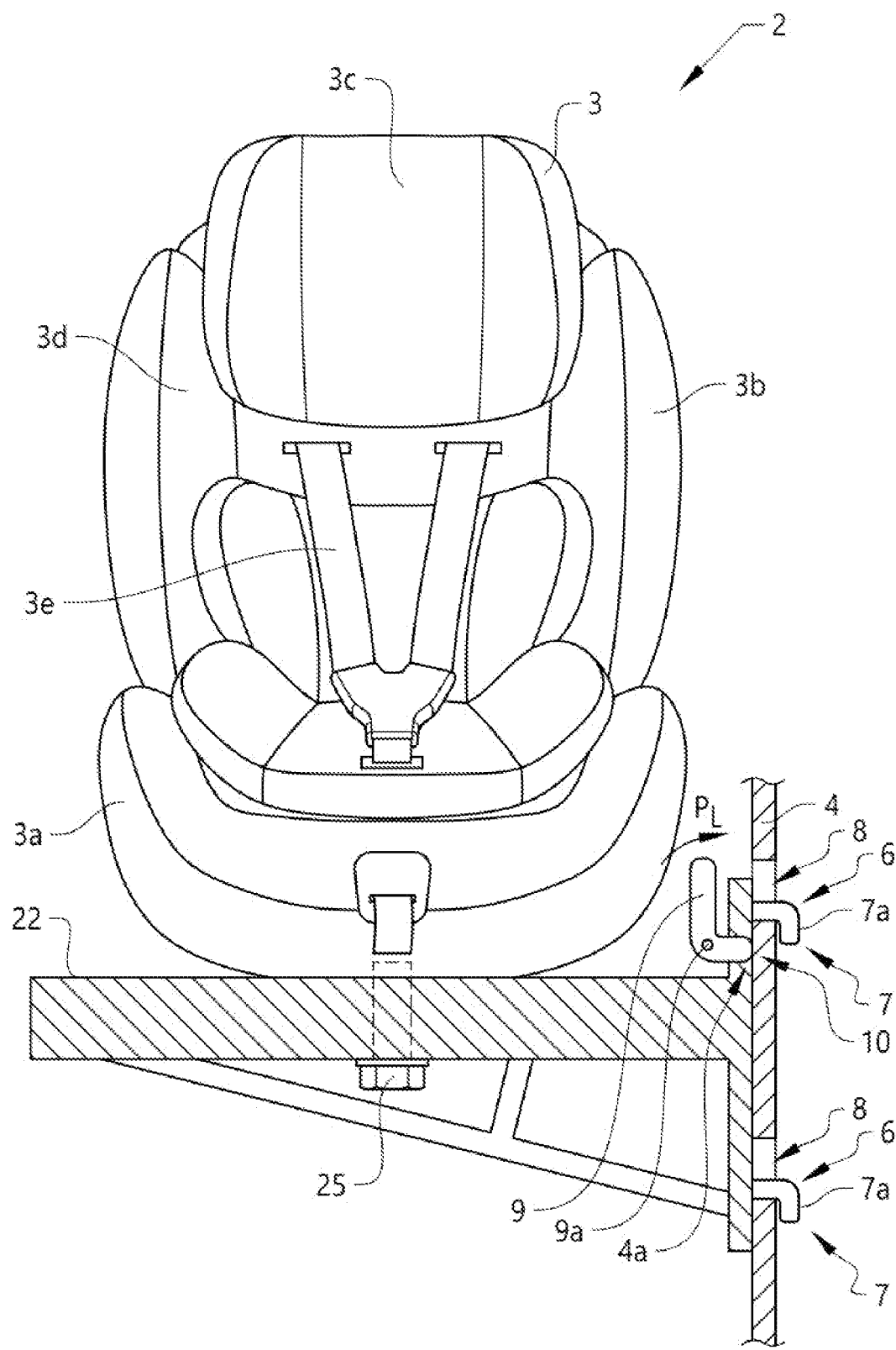
FIG. 6A-6B show schematically, in a front view and in a cross-sectional view, the child seat system and an attachment arrangement according to an alternative embodiment of the disclosure.
Figure 6B:
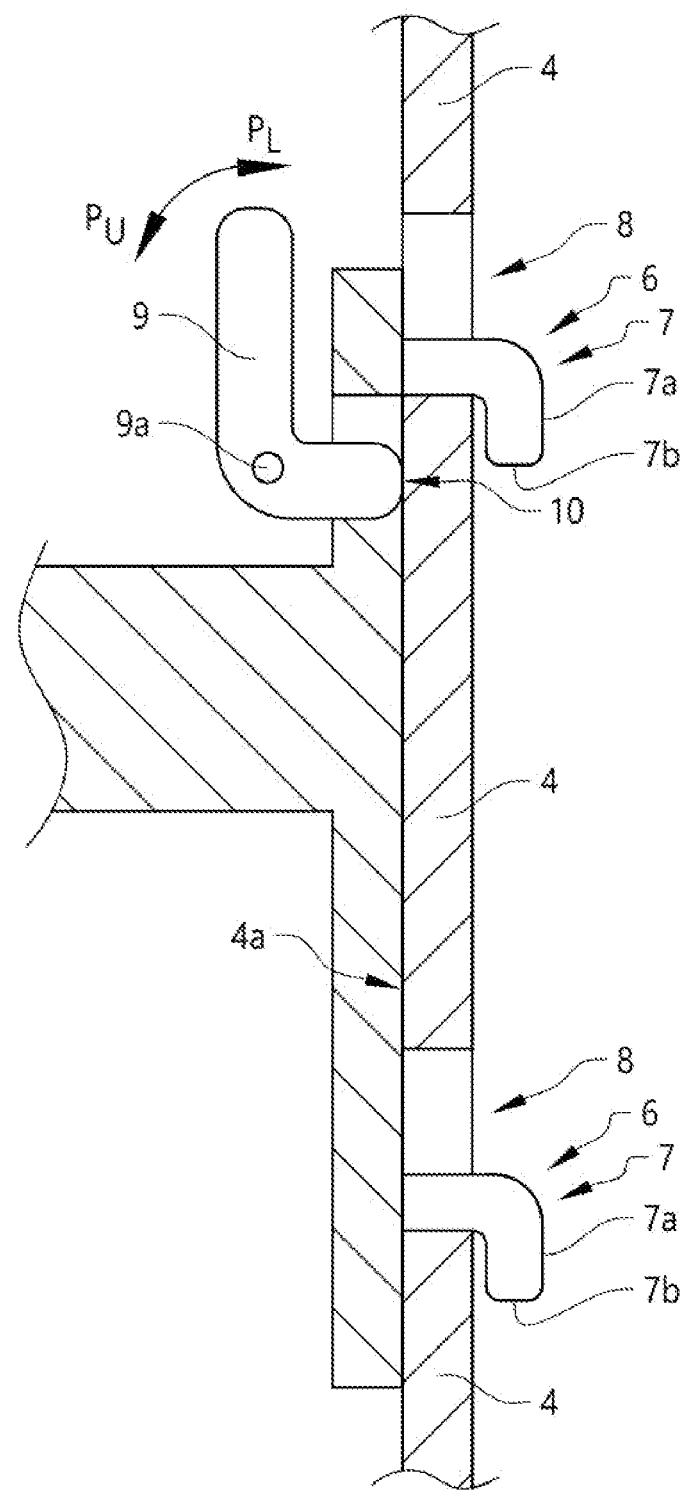
Figure 7A:
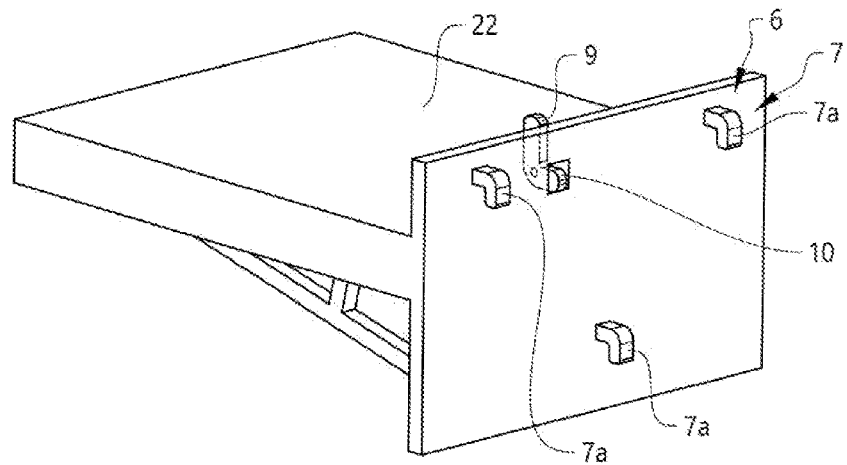
FIG. 7A-7C show schematically, in a perspective view and in cross-sectional views, the child seat platform structure with the attachment arrangement according to the alternative embodiment of the disclosure.
Figure 7B:
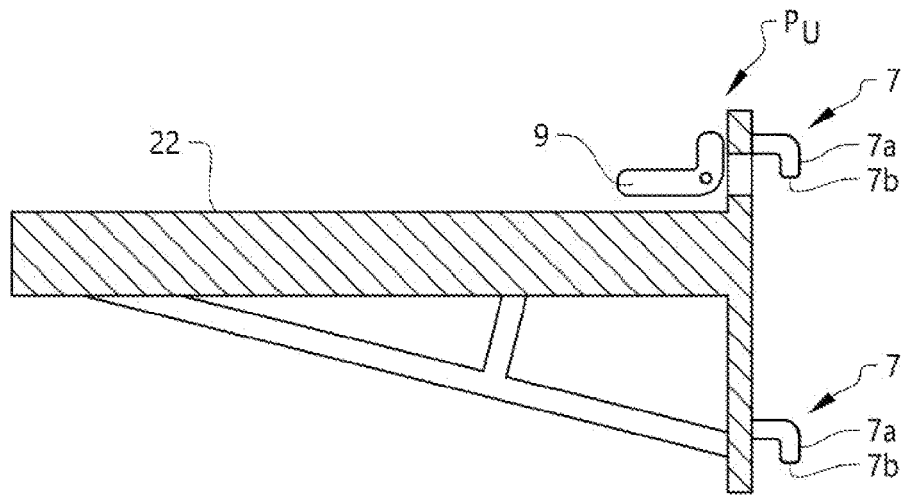
Figure 7C:
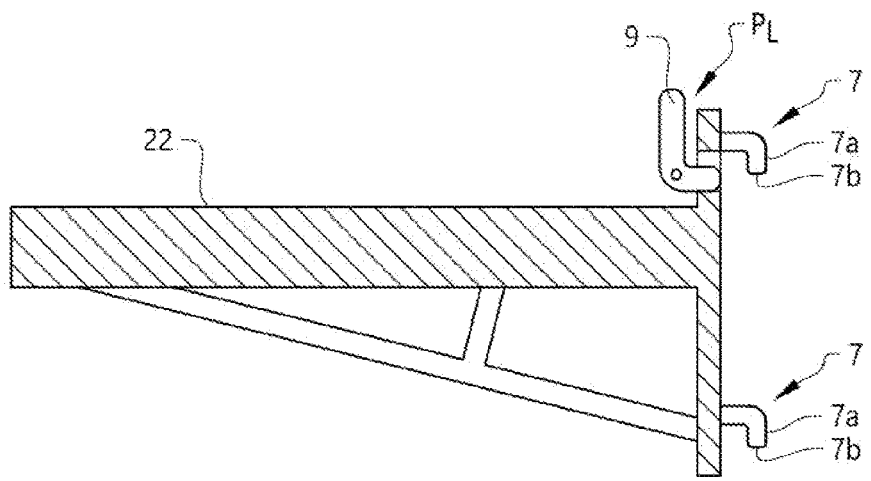
Figure 8A:
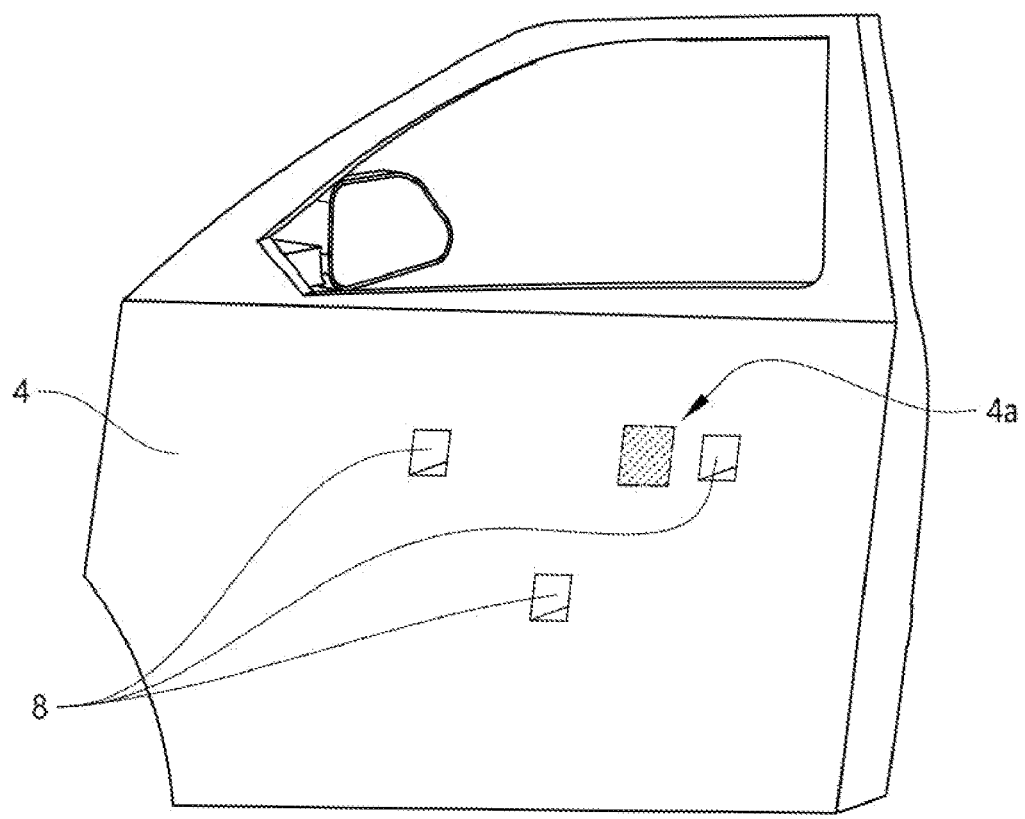
FIG. 8A-8B show schematically, in a perspective view and in a cross-sectional view, the vehicle door structure according to the alternative embodiment of the disclosure.
Figure 8B:
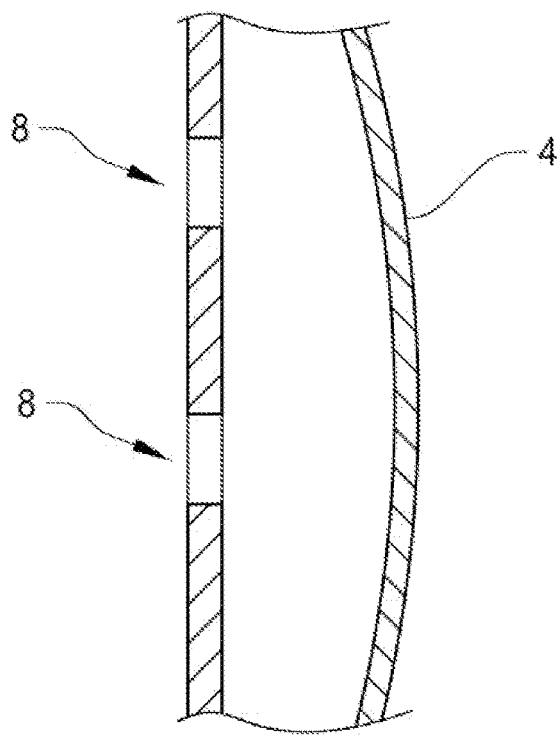

An alternative embodiment of the child seat system 2 is shown in FIGS. 6A-6B, 7A-7C, and 8A-8B. The child seat 3 is having a configuration similar to the one described above, and the child seat 3 comprises an attachment arrangement 6 adapted for attaching the child seat 3 to a vehicle door structure 4. In this embodiment, the attachment arrangement 6 comprises three attachment hooks 7a attached to the side plate of the child seat platform structure 22, and the attachment hooks 7a are arranged to cooperate with three corresponding receiving openings 8 in the vehicle door structure 4. As illustrated in FIGS. 6B, and 7B-7C, the attachment hooks 7a are bent in a shape where hook tips 7b of the attachment hooks 7a are pointing in a direction downwards when cooperating with the corresponding receiving openings 8. To attach the child seat 3 to the vehicle door structure 4, the attachment hooks 7a are aligned with the corresponding receiving openings 8 and pushed into the respective receiving openings 8. Once the attachment hooks 7a have entered the corresponding receiving openings 8, the child seat with the attachment hooks are pushed in a direction downwards to secure the child seat 3 to the vehicle door structure 4. In FIG. 6A, the attachment of the child seat 3 to the vehicle door structure 4 is schematically illustrated.

In the alternative embodiment shown in FIGS. 6A-6B, 7A-7C, and 8A-8B, the attachment arrangement 6 further comprises a locking lever 9 movably connected to the child seat platform structure 22. The locking lever 9 is pivotably arranged between an unlocked position $P_U$, as schematically illustrated in FIG. 7B, and a locked position $P_L$, as schematically illustrated in FIGS. 6A-6B and 7C. When the locking lever 9 is arranged in the unlocked position $P_U$, the child seat 3 is attachable to and removable from the vehicle door structure 4. The locking lever 9 comprises a locking surface 10, and the locking surface 10 is adapted for engaging a suitable vehicle door surface 4a of the vehicle door structure 4 when the locking lever 9 is arranged in the locked position $P_L$ preventing the child seat 3 from being removed from the vehicle door structure 4, as schematically illustrated in FIG. 6A.

To operate the child seat system 2 of the alternative embodiment schematically illustrated in FIGS. 6A-6B, 7A-7C, and 8A-8B, and to attach the child seat 3 to the vehicle door structure 4, the locking lever 9 is arranged in the unlocked position $P_U$ in order to prepare the child seat 3 for being attached to the vehicle door structure 4. To attach the child seat 3 to the vehicle door structure 4, the attachment hooks 7a are aligned with the corresponding receiving openings 8 of the vehicle door structure 4, and the attachment hooks 7a are pushed into the respective receiving openings 8. Once the attachment hooks 7a have entered the corresponding receiving openings 8, the child seat with the attachment hooks 7a are pushed in a direction downwards to secure the child seat 3 to the vehicle door structure 4. In FIG. 6A, the attachment of the child seat 3 to the vehicle door structure 4 is schematically illustrated. When the attachment hooks 7a are holding the child seat 3 in connection to the vehicle door structure 4, the locking lever 9 is moved into the locked position $P_L$ through a pivoting movement around a lever pivot point 9a, as illustrated in FIG. 6A. The locking lever 9 may comprise any suitable arrangement for pivoting the locking lever 9 in relation to the child seat platform structure 22, such as an axle arrangement or similar structure. In the locked position $P_L$, the locking surface 10 of the locking lever 9 is engaging the vehicle door surface 4a of the vehicle door structure 4, and through the engagement between the locking surface 10 and the vehicle door surface 4a, the child seat 3 is prevented from being removed from the vehicle door structure 4. The vehicle door surface 4a may be any suitable surface for engaging the locking surface 10. The vehicle door surface 4a and/or the locking surface 10 may be arranged with suitable materials for increased holding capacity and long-lasting capabilities, such as for example polymers, or a rubber materials with high friction. The locking lever 9 may be made of any suitable material, such as for example metals, plastic materials, composite materials or a combination of different materials. The locking lever 9 may further be arranged with a suitable locking arrangement for preventing unwanted or accidental movement of the locking lever 9 from the locked position $P_L$ to the unlocked position $P_U$.

To remove the child seat 3 from the vehicle door structure, the locking lever 9 is operated in the reverse order. The locking lever 9 is moved from the locked position $P_L$ to the unlocked position $P_U$, and the child seat 3 can be removed from the vehicle door structure 4.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Vehicle
2: Child seat system
3: Child seat
3a: Seat structure
3b: Backrest structure
3c: Headrest structure
3d: Outer cover structure
3e: Seat belt arrangement
4: Vehicle door structure
4a: Vehicle door surface
5: Interior compartment
6: Attachment arrangement
7: Attachment members
7a: Attachment hooks
7b: Hook tips
8: Receiving openings
9: Locking lever
9a: Lever pivot point
10: Locking surface
11: First locking member
12: Second locking member
13: Locking mechanism
14: Housing structure
15: Rod structure
15a: First end, Rod structure
15b: Second end, Rod structure
16: Opening structure
16a: Inner opening section
16b: Outer opening section
17: Locking arm
17a: Inner end, Locking arm
18: Locking engagement surface
19: Lever arm
20: Spring
21: Wire
22: Child seat platform structure
23: Actuating mechanism
24: Pivoting mechanism
25: Screw
C: Child
D: Vehicle door
$P_C$: Closed position
$P_O$: Open position
$D_A$: Axial direction
$P_1$: First position
$P_2$: Second position
$P_{R1}$: First rod position
$P_{R2}$: Second rod position

What is claimed is:

1. A child seat for a vehicle, wherein the child seat is configured for holding a child within an interior compartment of the vehicle, wherein the child seat comprises an attachment arrangement adapted for attaching the child seat to a vehicle door structure, the attachment arrangement comprising one or more attachment members arranged as attachment hooks, wherein the one or more attachment hooks are adapted for engaging one or more receiving openings of the vehicle door structure for holding the child seat in position in relation to the vehicle door structure, wherein the child seat further comprises a child seat platform structure attached to and arranged underneath the child seat, wherein the attachment arrangement is arranged on the child seat platform structure.

2. The child seat according to claim 1, wherein the attachment arrangement further comprises a locking lever, wherein the locking lever is pivotably arranged between an unlocked position and a locked position, wherein when the locking lever is arranged in the unlocked position the child seat is attachable to and removable from the vehicle door structure, wherein the locking lever comprises a locking surface, wherein the locking surface is adapted for engaging a vehicle door surface of the vehicle door structure when the locking lever is arranged in the locked position preventing the child seat from being removed from the vehicle door structure.

3. The child seat according to claim 1, wherein the attachment arrangement further comprises a first locking member, wherein the first locking member is adapted for cooperating with a second locking member of the vehicle door structure for holding the child seat in locking engagement to the vehicle door structure preventing the child seat from being removed from the vehicle door structure.

4. The child seat according to claim 3, wherein the first locking member comprises a locking mechanism adapted for releasably connecting the first locking member to the second locking member, wherein the child seat is adapted for being attachable to and removable from the vehicle door structure.

5. The child seat according to claim 4, wherein the locking mechanism comprises a housing structure and an elongated rod structure, wherein the rod structure is slidably arranged within the housing structure.

6. The child seat according to claim 5, wherein the rod structure comprises one or more locking arms pivotably attached to a first end of the rod structure, wherein the one or more locking arms are pivotable between a first position and a second position, wherein in the first position the one or more locking arms are aligned with, or essentially aligned with, an axial direction of the rod structure, wherein in the first position the rod structure and the housing structure are adapted to be insertable into and removable from the second locking member, and wherein in the second position the one or more locking arms are arranged at a locking angle in relation to the axial direction for holding the child seat in locking engagement with an opening structure.

7. The child seat according to claim 6, wherein a lever arm is connected to the housing structure and to a second end of the rod structure, wherein the lever arm is adapted for slidingly moving the rod structure in relation to the housing structure between a first rod position and a second rod position, wherein the one or more locking arms are adapted for being pivotable between the first position and the second position through the sliding movement of the rod structure in relation to the housing structure, wherein in the first rod position the one or more locking arms are arranged in the first position, and wherein in the second rod position the one or more locking arms are arranged in the second position.

8. The child seat according to claim 7, wherein the one or more locking arms are interconnected by one or more springs, wherein the one or more springs are adapted for holding the one or more locking arms in the second position.

9. The child seat according to claim 7, wherein the one or more locking arms are interconnected by one or more wires, wherein the one or more wires are adapted for interacting with the rod structure for positioning the one or more locking arms in the first position when the rod structure is positioned in the first rod position.

10. A child seat system for a vehicle comprising a child seat according to claim 1, wherein the child seat system further comprises a vehicle door structure, wherein the child seat is adapted for being attachable to the vehicle door structure.

11. The child seat system according to claim 10, wherein the child seat comprises an attachment arrangement for attaching the child seat to the vehicle door structure, wherein the attachment arrangement comprises one or more attachment hooks, and wherein the vehicle door structure comprises one or more receiving openings adapted for receiving the one or more attachment hooks for holding the child seat in position in relation to the vehicle door structure.

12. The child seat system according to claim 11, wherein the attachment arrangement comprises a first locking member and the vehicle door structure comprises a second locking member, wherein the first locking member is adapted for cooperating with the second locking member for holding the child seat in locking engagement to the vehicle door structure preventing the child seat from being removed from the vehicle door structure.

13. A child seat for a vehicle, wherein the child seat is configured for holding a child within an interior compartment of the vehicle, wherein the child seat comprises an attachment arrangement adapted for attaching the child seat to a vehicle door structure, wherein the attachment arrangement further comprises a locking lever, wherein the locking lever is pivotably arranged between an unlocked position and a locked position, wherein the locking lever comprises a locking surface adapted for engaging a vehicle door surface of the vehicle door structure when the locking lever is arranged in the locked position preventing the child seat from being removed from the vehicle door structure,
  wherein the child seat further comprises a child seat platform structure attached to and arranged underneath the child seat, wherein the attachment arrangement is arranged on the child seat platform structure, and
  wherein when the locking lever is arranged in the unlocked position the child seat is attachable to and removable from the vehicle door structure.

14. A child seat for a vehicle, wherein the child seat is configured for holding a child within an interior compartment of the vehicle, wherein the child seat comprises an attachment arrangement adapted for attaching the child seat to a vehicle door structure, wherein the attachment arrangement comprises a first locking member adapted for cooperating with a second locking member of the vehicle door structure for holding the child seat in locking engagement to the vehicle door structure preventing the child seat from being removed from the vehicle door structure, and
  wherein the child seat further comprises a child seat platform structure attached to and arranged underneath the child seat, wherein the attachment arrangement is arranged on the child seat platform structure.

15. The child seat according to claim 14, wherein the first locking member comprises a locking mechanism adapted for releasably connecting the first locking member to the second locking member, wherein the child seat is adapted for being attachable to and removable from the vehicle door structure.

16. The child seat according to claim 15, wherein the locking mechanism comprises a housing structure and an elongated rod structure, wherein the rod structure is slidably arranged within the housing structure.

17. The child seat according to claim 16, wherein the rod structure comprises one or more locking arms pivotably attached to a first end of the rod structure, wherein the one or more locking arms are pivotable between a first position and a second position, wherein in the first position the one or more locking arms are aligned with, or essentially aligned with, an axial direction of the rod structure, wherein in the first position the rod structure and the housing structure are adapted to be insertable into and removable from the second locking member, and wherein in the second position the one or more locking arms are arranged at a locking angle in relation to the axial direction for holding the child seat in locking engagement with an opening structure.

18. The child seat according to claim 17, wherein a lever arm is connected to the housing structure and to a second end of the rod structure, wherein the lever arm is adapted for slidingly moving the rod structure in relation to the housing structure between a first rod position and a second rod position, wherein the one or more locking arms are adapted for being pivotable between the first position and the second position through the sliding movement of the rod structure in relation to the housing structure, wherein in the first rod position the one or more locking arms are arranged in the first position, and wherein in the second rod position the one or more locking arms are arranged in the second position.

19. The child seat according to claim 18, wherein the one or more locking arms are interconnected by one or more springs, wherein the one or more springs are adapted for holding the one or more locking arms in the second position.

20. The child seat according to claim 18, wherein the one or more locking arms are interconnected by one or more wires, wherein the one or more wires are adapted for interacting with the rod structure for positioning the one or more locking arms in the first position when the rod structure is positioned in the first rod position.

* * * * *